June 10, 1941.   W. R. FREEMAN   2,244,834
COMBINED STOP LIGHT SWITCH AND FITTING BOLT
Filed Feb. 4, 1939

INVENTOR
W. R. FREEMAN
BY
ATTORNEY

Patented June 10, 1941

2,244,834

UNITED STATES PATENT OFFICE 2,244,834

COMBINED STOP LIGHT SWITCH AND FITTING BOLT

Walter R. Freeman, University City, Mo., assignor to Wagner Electric Corporation, St. Louis, Mo., a corporation of Delaware Application February 4, 1939, Serial No. 254,565

7 Claims. (Cl. 200—52)

My invention relates to connecting means for fluid pressure systems and more particularly to a fitting bolt construction for use in connecting a master cylinder of a fluid braking apparatus to a conduit.

In prior constructions it has been the practice to employ a fitting bolt for connecting the master cylinder to the conduit or conduits leading therefrom and to associate with this bolt a separable stop light switch construction. This arrangement necessitates a joint between the fitting bolt and switch, thus increasing the number of joints in the fluid system wherein leakage could possibly take place. Also the construction cost is quite high as separate parts must be made for the fitting bolt and for the casing of the switch together with the necessary thread cutting for the joint.

One of the objects of my invention is to produce a combined stop light switch and fitting bolt which will employ only a single member for both the bolt and the housing of the switch, thereby eliminating a joint, decreasing the cost of manufacture and installation and producing a compact assembly.

Figure 1:
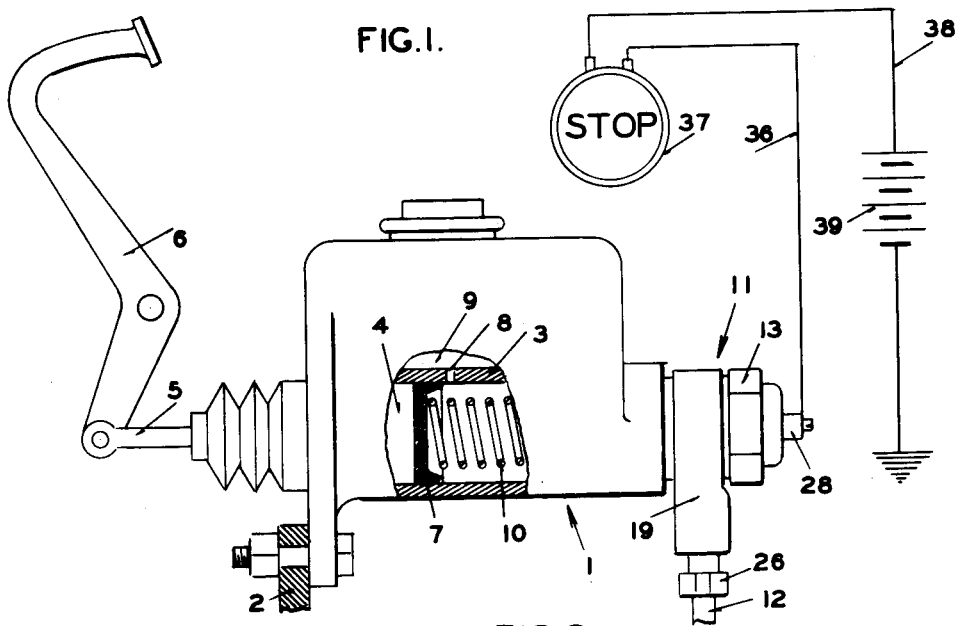
Figure 2:
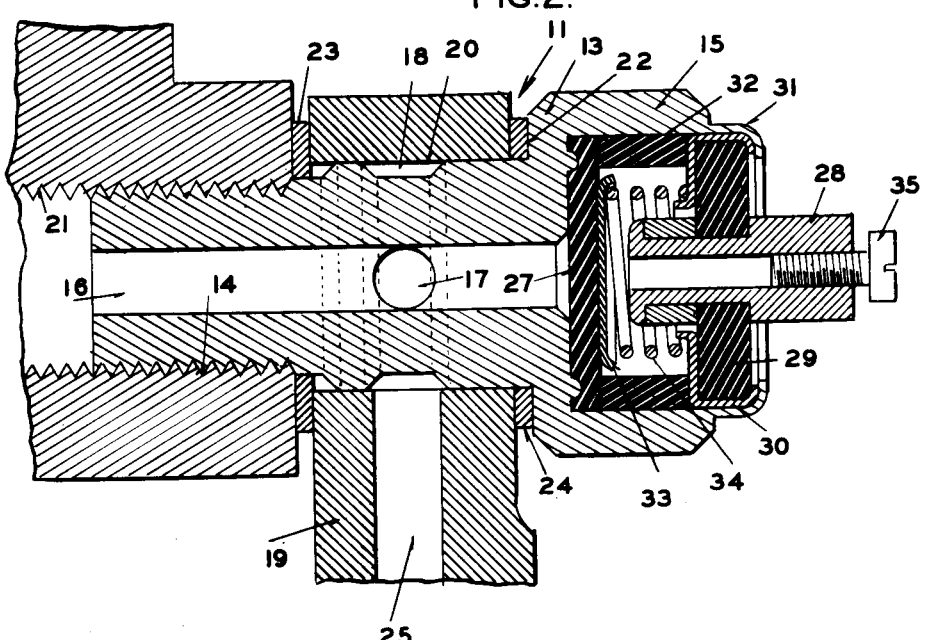

Other objects of my invention will become apparent from the following description taken in connection with the accompanying drawing in which Figure 1 is a view, partly in section and partly diagrammatic, showing my invention embodied in a connecting means between a master cylinder and a conduit; and Figure 2 is an enlarged cross-sectional view of the connecting means.

Referring to the drawing in detail, numeral 1 indicates the present day master cylinder construction which is mounted on a support 2 and is employed for placing the fluid under pressure for operating the hydraulic brake actuating system. This master cylinder construction comprises a cylinder 3 having reciprocable therein a piston 4 actuated by a piston rod 5 and a pedal 6. The piston is provided with a packing cup 7 and when the piston is in its retracted position the packing cup uncovers a porthole 8 for placing the reservoir 9 in communication with the cylinder ahead of the piston to allow for expansion and contraction of the fluid. A spring 10 is employed to move the piston to its retracted position. The forward end of the cylinder has associated therewith a connecting means 11 which is adapted to connect the cylinder to the conduit 12 leading to the brake actuating fluid motors (not shown). This connecting means embodies my novel fitting bolt and combined stop light switch construction which will now be described.

Referring to Figure 2, the fitting bolt 13 is provided with threads 14 at one end and with a cup-shaped integral portion 15 at its other end. A central bore 16 extends entirely through the bolt and connects with a cross passage 17 which communicates with an annular groove 18 in the smooth external surface of the intermediate portion of the bolt. A connecting member 19 is provided with a bore 20 and is mounted upon the intermediate portion of the bolt. When the bolt is screwed into the threaded outlet opening 21 of the master cylinder, the connecting member will be clamped between the master cylinder and the shoulder 22 at the cup-shaped end of the bolt. Suitable gaskets 23 and 24 are provided to insure that no leakage will occur at the connecting member. The connecting member is provided with a passage 25 communicating with the groove 18 and the outer end of the passage is connected by a nut 26 to conduit 12.

The stop light switch for closing the stop light circuit whenever the brakes are applied is enclosed within the cup-shaped portion 15 of the fitting bolt. A flexible diaphragm 27 is positioned in the bottom of the cup-shaped portion to close off passage 16 and to also provide means which may be flexed under the action of fluid pressure to close the switch. The single terminal 28 of the switch is mounted in suitable insulation material 29 enclosed in a metal cup 30 of such diameter as to fit in the end of the cup-shaped portion 15 and to be secured thereto by a turned over integral flange 31. A ring 32 spaces the cup 30 from the diaphragm 27 and also forces the peripheral portion of the diaphragm against the bottom wall of the cup-shaped portion 15. A metal contact plate 33 is associated with the flexible diaphragm and is normally held out of contact with the inner end of the terminal member 28 by a spring 34, this spring also normally maintaining the central portion of the diaphragm against the bottom wall of the cup-shaped portion. The terminal member 28 has associated therewith an attaching bolt 35 by which a conductor 36 can be connected to the terminal, this conductor leading to one terminal of the stop light 37 (Figure 1). The other terminal of the stop light is connected by a conductor 38 to one terminal of a battery 39 which has its other terminal grounded. The outer surface of the cup-shaped portion 15 is hexagonal in shape in order that the bolt can be conveniently screwed by a suitable tool into the outlet of the master cylinder.

In operation when the master cylinder piston is actuated, fluid under pressure will flow through the passage 16 of the bolt, the cross passage 17, groove 18, and passage 25 to conduit 12 leading to the brake actuating motors. Fluid under pressure will also act on the diaphragm 27 to so flex this diaphragm that the contact plate 33 will be forced into engagement with the terminal member 28. This will close the stop light circuit since the contact plate is grounded by means of the spring 34, the metal cup 30, the fitting bolt, and the master cylinder.

It is to be noted that with the fitting bolt construction described I have eliminated the joint between the bolt and the stop light switch when the stop light switch is contained in a separate housing and screwed into the outer end of the bolt as has been the construction heretofore. Also the over-all dimensions have been decreased. The entire construction is considerably cheaper to manufacture and is more efficient in operation than the prior two-piece construction. Installation is also easier and quicker.

Particular attention is also called to the switch construction as such embodies only one terminal post instead of two as does the switch as now constructed. This results in a cheaper construction and also one which is more rugged and less liable to become damaged since only one terminal post must be supported in the insulation 29.

It is also to be noted that in the electrical circuit employed the arrangement is such that the stop light is interposed between the battery and the switch. Thus all current reaching the switch must pass through the filament of the stop light and the terminal of the switch is not directly connected to the "hot" end of the battery as has been the prior practice when two terminal switches are employed. If the switch should become shorted, the short would not be across the battery only but would include the stop light. If the stop light is "on" when it should not be, it informs the vehicle operator that there is a short in the circuit.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In hydraulic braking apparatus embodying a master cylinder having an outlet and a conduit for conveying fluid to a member to be actuated, the combination therewith of a one-piece fitting member having a longitudinal passage therethrough, said fitting member adapted to be secured at one end to the master cylinder outlet, said other end of the fitting member having a portion forming a chamber in communication with the longitudinal passage, means including an electrical switch in said chamber and adapted to be operated by fluid under pressure in the passage, and means for connecting the longitudinal passage to the conduit and comprising a second fitting member clamped in sealed operative position by the first named fitting member.

2. In hydraulic braking apparatus embodying a master cylinder having a threaded outlet and a conduit for conveying fluid to a member to be actuated, the combination therewith of a one-piece fitting member having a longitudinal passage therethrough and a cross passage communicating therewith, said fitting member being provided with threads at one end for cooperation with the threads of the master cylinder outlet, said other end of the fitting member having a portion forming a chamber in communication with the longitudinal passage, a movable element for separating the chamber from the passage, means including an electrical switch in said chamber and operated by the movable element when subjected to fluid under pressure in the longitudinal passage, and means comprising a member surrounding the fitting member for connecting the cross passage to the conduit, said member being detachably clamped by the bolt in sealed operative position.

3. In hydraulic braking apparatus embodying a master cylinder having a threaded outlet and a conduit for conveying fluid to a member to be actuated, the combination therewith of a one-piece fitting member having a longitudinal passage therethrough and a cross passage communicating therewith, one end of said fitting member being provided with threads for cooperation with the threaded outlet of the master cylinder and the other end being provided with an enlarged cup-shaped portion having a wrench receiving external surface, a connecting member surrounding the body of the fitting member and provided with means for connecting the conduit to the cross passage, said connecting member being clamped by the cup-shaped portion of the fitting member to the master cylinder when said member is screwed into the outlet, a diaphragm for separating the chamber from the passage, and an electrical switch in said chamber operated by the diaphragm when subjected to fluid under pressure in the passage.

4. A combined fitting bolt and stop light switch comprising a one-piece member having a longitudinal fluid conducting passage therethrough and a cross passage communicating therewith, one end of said member being provided with external threads, said other end being enlarged and provided with an irregular outer surface to receive a wrench and a chamber therein in communication with the longitudinal passage, an electrical switch mounted in said chamber, and a movable wall dividing the longitudinal passage and the chamber and adapted to actuate the switch.

5. A combined fitting bolt and stop light switch comprising a one-piece member having a longitudinal fluid conducting passage therethrough, an annular external groove and a cross passage communicating with said passage and groove, one end of said member being provided with external threads for co-operating with a threaded opening whereby the member may clamp a conduit fitting in position to communicate with the groove, said other end being provided with an enlarged chamber communicating with the longitudinal passage, an electrical switch mounted in said chamber, and a flexible diaphragm separating the longitudinal passage from the chamber, and means for closing the switch when the diaphragm is flexed.

6. A combined fitting bolt and stop light switch comprising a one-piece member of conducting material having a longitudinal fluid conducting passage therethrough and a cross passage communicating therewith, one end of said member being provided with external threads for co-operating with a threaded opening whereby the member may clamp a conduit fitting in position to communicate with the cross passage, said other end being provided with a switch containing chamber in communication with the longitudinal passage, an electrical switch mounted in said chamber and comprising a frame portion of conducting material secured to the member in direct contact therewith, a single terminal member secured in said frame by insulation material, a contact member, means including a spring for electrically connecting the contact member to the frame and normally mounting said contact member out of engagement with the terminal member, and a movable wall dividing the longitudinal passage and chamber and adapted to move the contact member into engagement with the terminal member.

7. A switch construction for operation by fluid under pressure in a fluid pressure system, a single integral member of conducting material having a cup-shaped chamber at one end, a passage from said chamber to the other end, and threads on said latter end for attachment to a threaded opening of the fluid pressure system, a flexible diaphragm in the bottom of the chamber and overlying the end of the passage, a fixed frame member of conducting material secured to the open end of the chamber and in contact with the material thereof, a single fixed terminal member centrally secured in said frame by insulating material and projecting into the chamber, a contacting plate positioned against the chamber side of the diaphragm, and a coil spring of conducting material surrounding the projecting portion of the terminal member and interposed between the frame and the contacting plate and normally maintaining the plate spaced from the terminal member and the diaphragm against the bottom wall of the chamber, said diaphragm when acted on by fluid pressure from the system entering said passage being flexed against the bias of the spring and the plate caused to engage the projection and establish an electrical connection between it and the frame member.

WALTER R. FREEMAN.